(12) United States Patent
Schmalenberg et al.

(10) Patent No.: US 11,513,603 B2
(45) Date of Patent: Nov. 29, 2022

(54) SYSTEM AND METHOD FOR INTERPRETING GESTURES

(71) Applicant: Toyota Motor Engineering & Manufacturing North America, Inc., Plano, TX (US)

(72) Inventors: Paul Donald Schmalenberg, Ann Arbor, MI (US); Hiroshi Yokoyama, Ann Arbor, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 352 days.

(21) Appl. No.: 16/777,165

(22) Filed: Jan. 30, 2020

(65) Prior Publication Data

US 2021/0240274 A1 Aug. 5, 2021

(51) Int. Cl.
*G06F 3/01* (2006.01)
*G01S 7/41* (2006.01)
(Continued)

(52) U.S. Cl.
CPC .............. *G06F 3/017* (2013.01); *B60K 35/00* (2013.01); *G01S 7/415* (2013.01); *G01S 13/583* (2013.01);
(Continued)

(58) Field of Classification Search
CPC . G06F 3/017; B60K 35/00; B60K 2370/1464; B60K 2370/21;
(Continued)

(56) References Cited

U.S. PATENT DOCUMENTS 9,599,702 B1 * 3/2017 Bordes .................... G01S 7/354
9,921,660 B2 3/2018 Poupyrev
(Continued)

FOREIGN PATENT DOCUMENTS

WO 2012153227 A1 11/2012

OTHER PUBLICATIONS

Pu et al., "Whole-Home Gesture Recognition Using Wireless Signals," MobiCom'13, Sep. 30-Oct. 4, Miami, FL, USA, 12 pages.
(Continued)

*Primary Examiner* — Grant Sitta
(74) *Attorney, Agent, or Firm* — Christopher G. Darrow; Darrow Mustafa PC

(57) ABSTRACT

A system for interpreting gestures may include one or more processors, at least three Doppler radar devices, and a memory device. The memory device may have a receiving module, a cube generating module, and a classifying module. The receiving module may include instructions that cause the one or more processors to receive Doppler information from the at least three Doppler radar devices. The cube generating module may include instructions that cause the one or more processors to generate a micro-Doppler cube by projecting Doppler information in X, Y, and Z-directions over a period of time into the micro-Doppler cube. The classifying module may include instructions that cause the one or more processors to classify one or more gestures performed by an extremity when located in the volume into a category of a plurality of categories based on the micro-Doppler cube.

17 Claims, 5 Drawing Sheets

(51) Int. Cl.
*G01S 13/58* (2006.01)
*B60K 35/00* (2006.01)
*G01S 13/87* (2006.01)

(52) U.S. Cl.
CPC ...... *G01S 13/87* (2013.01); *B60K 2370/1464* (2019.05)

(58) Field of Classification Search
CPC ..... B60K 2370/48; B60K 37/06; G01S 7/415; G01S 13/583; G01S 13/87; G06V 20/59; G06V 40/28; B60W 2420/52; B60W 2420/60
See application file for complete search history.

(56) References Cited

U.S. PATENT DOCUMENTS

| | | | | |
|---|---|---|---|---|
| 10,409,385 B2* | 9/2019 | Poupyrev | ................ | G01S 13/42 |
| 10,664,061 B2* | 5/2020 | Poupyrev | ................ | G01S 13/88 |
| 2010/0202656 A1 | 8/2010 | Ramakrishnan et al. | | |
| 2018/0046255 A1 | 2/2018 | Rothera et al. | | |
| 2018/0120420 A1 | 5/2018 | McMahon et al. | | |
| 2019/0204834 A1* | 7/2019 | Harrison | ................ | G01S 13/867 |
| 2019/0329782 A1* | 10/2019 | Shalev-Shwartz | ... | G08G 1/0145 |
| 2019/0331768 A1* | 10/2019 | Harrison | ................ | G01S 7/417 |
| 2020/0319302 A1* | 10/2020 | Nanzer | ............... | G01S 13/4454 |

OTHER PUBLICATIONS

Przybyla et al., "3D Ultrasonic Gesture Recognition," Digest of Technical Papers—IEEE Intentional Solid-State Circuits conference, 4 pages (2014).

Wan et al., "Gesture Recognition for smart home applications using portable radar sensors," 2014 36th Annual International Conference of the IEEE Engineering in Medicine and Biology Society, 5 pages.

Li et al., "Sparsity-based Dynamic Hand Gesture Recognition Using Micro-Doppler Signatures," 2017 IEEE Radar Conference (RadarConf), 0928-0931.

* cited by examiner

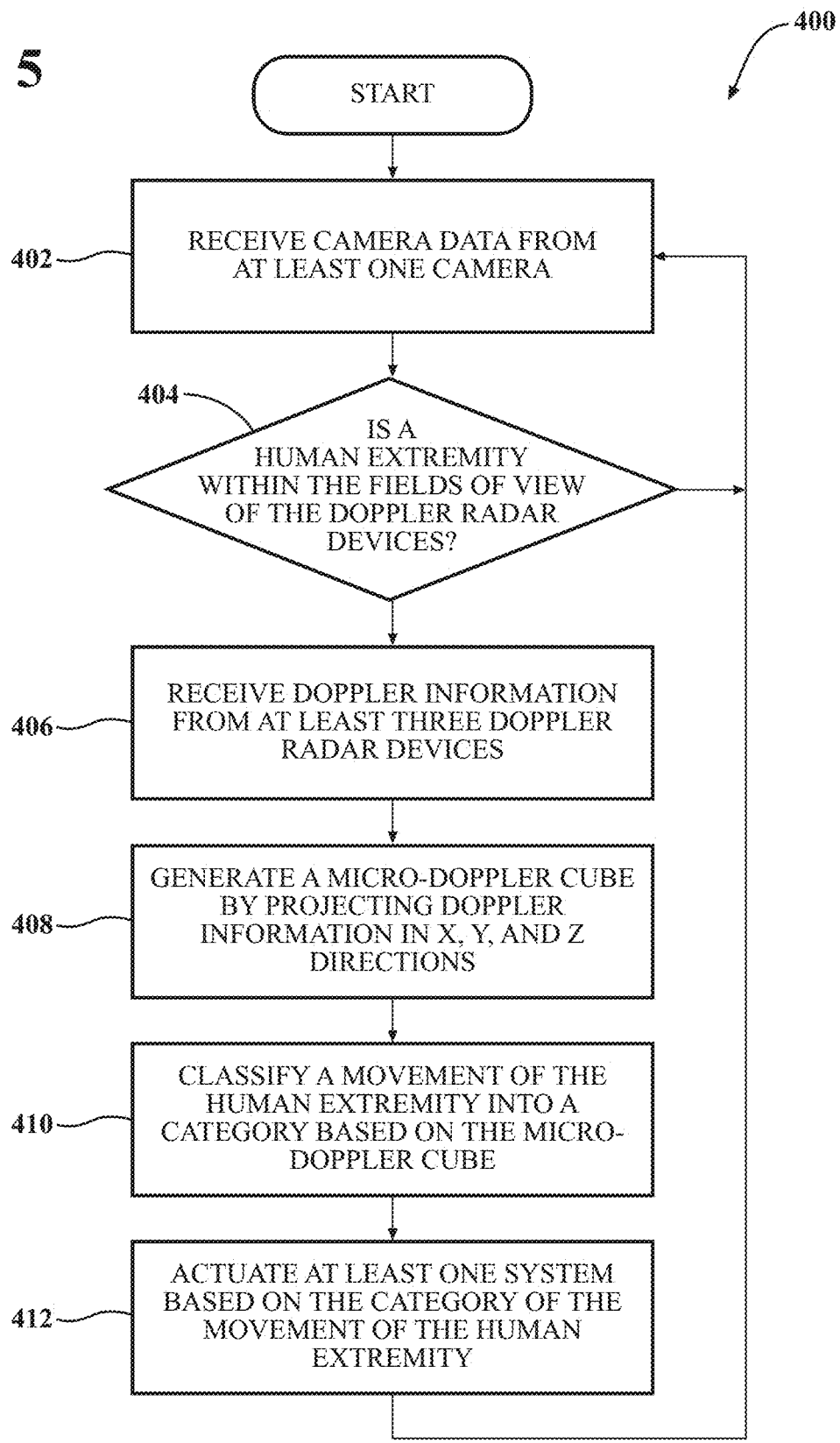

SYSTEM AND METHOD FOR INTERPRETING GESTURES

TECHNICAL FIELD

The subject matter described herein relates, in general, to systems and methods for interpreting gestures, especially gestures made by a human extremity, such as a human hand.

BACKGROUND

The background description provided is to present the context of the disclosure generally. Work of the inventor, to the extent it may be described in this background section, and aspects of the description that may not otherwise qualify as prior art at the time of filing, are neither expressly nor impliedly admitted as prior art against the present technology.

Some systems may be actuated by an operator using one or more control mechanisms. Some of these control mechanisms include buttons, knobs, switches, touchscreens, and the like. Vehicles, especially modern vehicles with advanced infotainment systems and other advanced systems, may utilize a variety of different types of control mechanisms to control these systems. In some cases, one type of vehicle may have systems that rely entirely on a touchscreen control mechanism, while another type of vehicle utilizes a combination of different control mechanisms. These variations in the use of different control mechanisms to control different systems may result in frustration to the operators of these systems.

SUMMARY

This section generally summarizes the disclosure and is not a comprehensive explanation of its full scope or all its features.

In one embodiment, a system for interpreting gestures may include one or more processors, at least three Doppler radar devices, and a memory device. The memory device may have a receiving module, a cube generating module, and a classifying module. The receiving module may include instructions that cause the one or more processors to receive Doppler information from the at least three Doppler radar devices. The cube generating module may include instructions that cause the one or more processors to generate a micro-Doppler cube by projecting Doppler information in X, Y, and Z-directions over a period of time into the micro-Doppler cube. The classifying module may include instructions that cause the one or more processors to classify one or more gestures performed by an extremity when located in the volume into a category of a plurality of categories based on the micro-Doppler cube.

In another embodiment, a method for interpreting gestures may include the steps of receiving Doppler information from at least three Doppler radar devices, each of the at least three Doppler radar devices having a field of view that includes a volume, generating a micro-Doppler cube by projecting Doppler information in X, Y, and Z-directions over a period of time into the micro-Doppler cube, and classifying one or more gestures performed by an extremity when located in the volume into a category of a plurality of categories based on the micro-Doppler cube.

In yet another embodiment, a non-transitory computer-readable medium for interpreting gestures may include instructions that when executed by one or more processors cause the one or more processors to receive Doppler information from at least three Doppler radar devices, each of the at least three Doppler radar devices having a field of view that includes a volume, generate a micro-Doppler cube by projecting Doppler information in X, Y, and Z-directions over a period of time into the micro-Doppler cube, and classify one or more gestures performed by an extremity when located in the volume into a category of a plurality of categories based on the micro-Doppler cube.

Further areas of applicability and various methods of enhancing the disclosed technology will become apparent from the description provided. The description and specific examples in this summary are intended for illustration only and are not intended to limit the scope of the present disclosure.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

FIG. 5 illustrates an example of a method for interpreting gestures.

DETAILED DESCRIPTION

Described is a system and method for interpreting gestures, such as gestures performed by a human extremity, such as a human hand. The system may include three Doppler radar devices that are located orthogonal to each other. The three Doppler radar devices each have a field-of-view. The fields of view of the Doppler radar devices may encompass a volume, wherein a human may extend an extremity into and perform a gesture, such as a hand gesture.

One or more processors receive Doppler information from the Doppler radar devices regarding the movement of the extremity within the volume. The processor then generates a micro-Doppler cube that encompasses the Doppler information from each of the Doppler radar devices. For example, the Doppler information could include information regarding the Doppler Effect observed by the Doppler radar devices. The processor, which may utilize a machine learning trained algorithm, may then be able to classify the movement or gesture of the extremity within the volume by observing the micro-Doppler cube.

The system and method may also utilize a camera that is configured to capture images of the volume. The processor may evaluate the images captured by the camera to determine when the human extremity is located within the volume. When the human extremity is located within the volume, this may cause the processor to collect information from the Doppler radar devices to generate the micro-Doppler cube. Further, the camera may also be utilized to segment image data from the camera data into fast-moving parts and slow-moving parts and associate portions of the Doppler information with fast-moving parts and slow-moving parts of the camera data.

Figure 1:
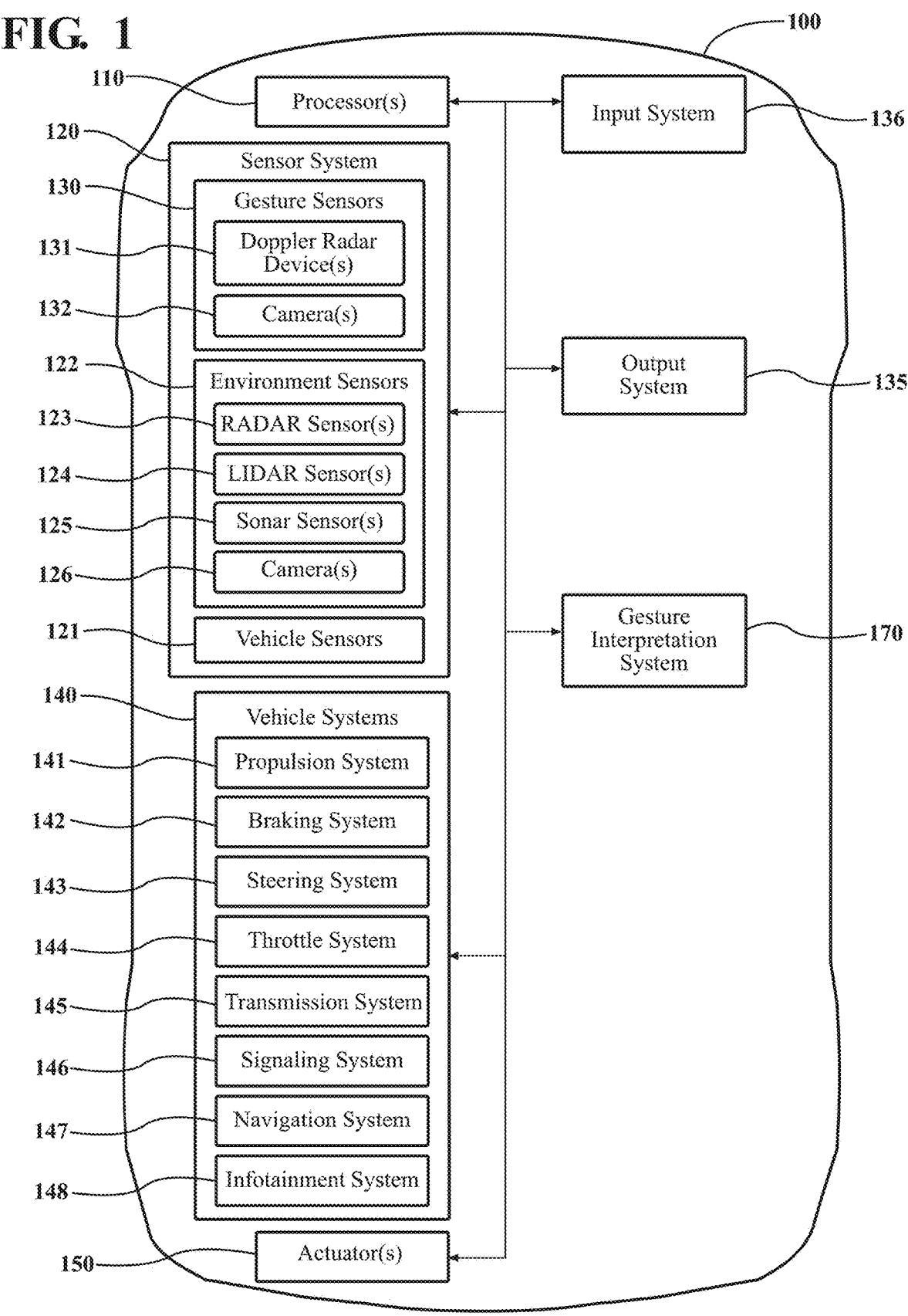
FIG. 1 illustrates an example of a vehicle incorporating a system for interpreting gestures.

Referring to FIG. 1, an example of a vehicle 100 is illustrated. As used herein, a "vehicle" is any form of powered transport. In one or more implementations, the vehicle 100 is an automobile. While arrangements will be described herein with respect to automobiles, it will be understood that embodiments are not limited to automobiles. In some implementations, the vehicle 100 may be any robotic device or form of powered transport.

The vehicle 100 may be an autonomous, semi-autonomous, or non-autonomous vehicle. In various embodiments, the automated/autonomous systems or combination of systems may vary. For example, in one aspect, the automated system is a system that provides autonomous control of the vehicle according to one or more levels of automation, such as the levels defined by the Society of Automotive Engineers (SAE) (e.g., levels 0-5).

The vehicle 100 also includes various elements. It will be understood that in various embodiments it may not be necessary for the vehicle 100 to have all of the elements shown in FIG. 1. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1. While the various elements are shown as being located within the vehicle 100 in FIG. 1, it will be understood that one or more of these elements can be located external to the vehicle 100. Further, the elements shown may be physically separated by large distances and provided as remote services (e.g., cloud-computing services).

Some of the possible elements of the vehicle 100 are shown in FIG. 1 and will be described along with subsequent figures. However, a description of many of the elements in FIG. 1 will be provided after the discussion of FIGS. 2-5 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. It should be understood that the embodiments described herein may be practiced using various combinations of these elements.

In either case, the vehicle 100 includes a gesture interpretation system 170. The gesture interpretation system 170 may, in one example, be able to interpret gestures from an extremity, such as a human hand, and actuate one or more control systems based on the interpretation of the gestures from the extremity. As will be explained in greater detail later, the gesture interpretation system 170 may include at least three Doppler radar devices that are able to capture the movements of a human extremity. Based on these captured movements, the Doppler radar devices output Doppler information that may be interpreted by a processor and then utilized to actuate one or more systems, such as the vehicle systems 140, which will be described later in this specification.

Moreover, the vehicle 100 includes a sensor system 120 that includes gesture sensors 130. The gesture sensors 130 may include Doppler radar device(s) 131 and camera(s) 132 that may be mounted within a cabin of the vehicle 100. The Doppler radar device(s) 131 may be radars that use the Doppler Effect to produce velocity data about objects at a distance. The Doppler radar device(s) 131 do this by bouncing a microwave signal off a desired target and analyzing how the object's motion has altered the frequency of the returned signal. This variation gives direct and highly accurate measurements of the radial component of a target's velocity relative to the Doppler radar device(s) 131. The camera(s) 132 may be a low frame rate camera(s).

Figure 2:
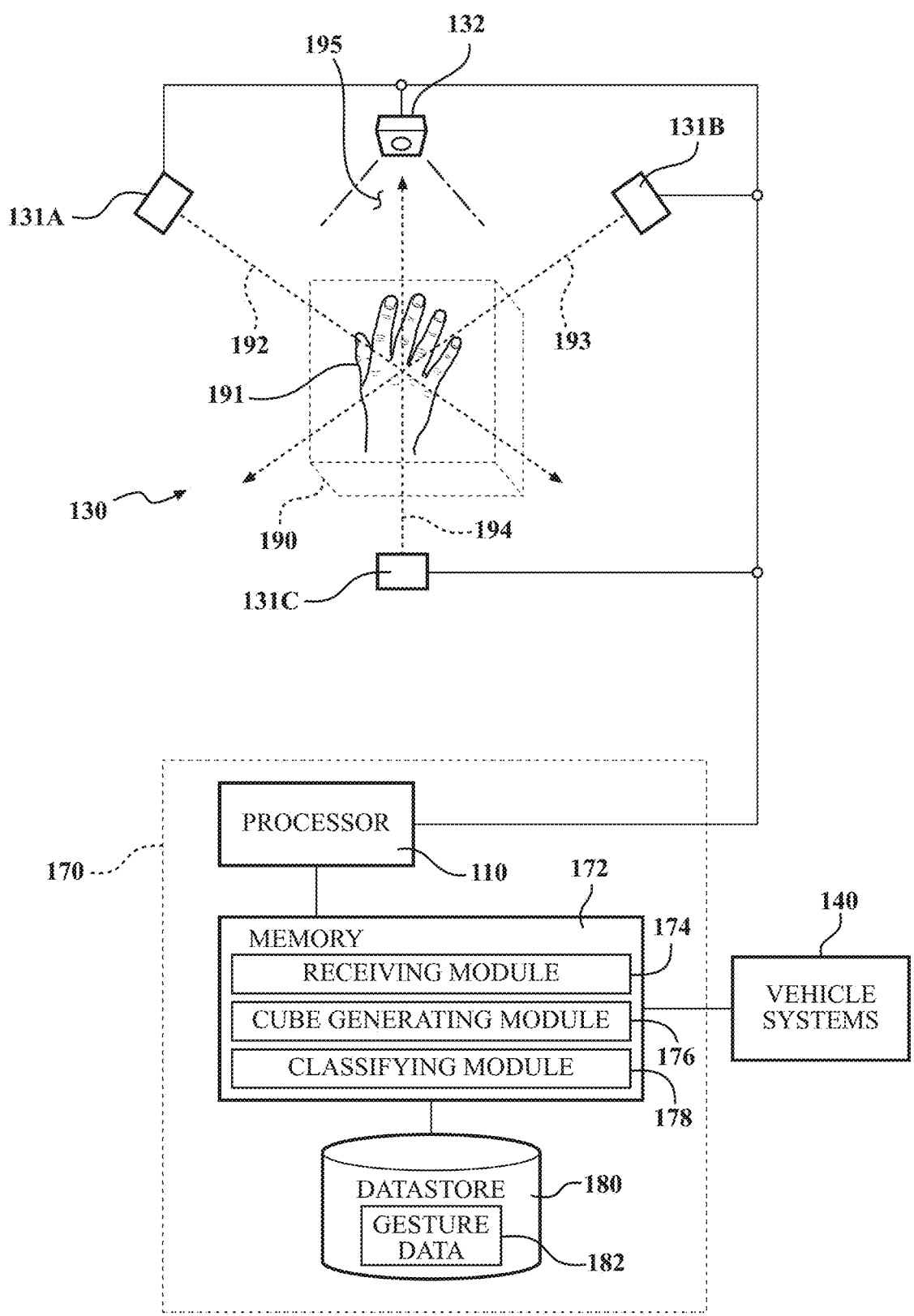
FIG. 2 illustrates a more detailed view of the system for interpreting gestures.

As best illustrated in FIG. 2, the gesture sensors 130 include three Doppler radar devices 131A-131C. The three Doppler radar devices 131A-131C may be located orthogonal to one another. The Doppler radar devices 131A-131C may have field-of-views in the X-direction 192, Y-direction 193, and Z-direction 194, respectively. These fields of view may overlap and may encompass a volume 190 wherein a human extremity 191 may be placed within the volume 190. As will be described later, gestures performed by the human extremity 191 when in the volume 190 can be interpreted by the gesture interpretation system 170 to control one or more other systems, such as vehicle systems 140.

The gesture sensors 130 may also include one or more camera(s) 132 that have a field-of-view 195 that may include the volume 190. The camera(s) 132 may be able to generate camera data in the form of one or more captured images captured by the camera(s) 132. Again, as will be described later in the specification, information from the camera(s) 132 may be used to determine when the human extremity 191 is located within the volume 190 and/or be utilized to interpret the gestures performed by the human extremity 191 when placed within the volume 190.

With reference to FIG. 2, one embodiment of the gesture interpretation system 170 is further illustrated. As shown, the gesture interpretation system 170 includes a processor(s) 110. Accordingly, the processor(s) 110 may be a part of the gesture interpretation system 170 or the gesture interpretation system 170 may access the processor(s) 110 through a data bus or another communication path. In one or more embodiments, the processor(s) 110 is an application-specific integrated circuit that is configured to implement functions associated with a receiving module 174, a cube-generating module 176, and a classifying module 178. In general, the processor(s) 110 is an electronic processor such as a microprocessor that is capable of performing various functions as described herein.

In one embodiment, the gesture interpretation system 170 includes a memory 172 that stores the receiving module 174, the cube-generating module 176, and the classifying module 178. The memory 172 is a random-access memory (RAM), read-only memory (ROM), a hard disk drive, a flash memory, or other suitable memory for storing the modules 174, 176, and/or 178. The modules 174, 176, and/or 178 are, for example, computer-readable instructions that, when executed by the processor(s) 110, cause the processor(s) 110 to perform the various functions disclosed herein.

Furthermore, in one embodiment, the gesture interpretation system 170 includes a data store 180. The data store 180 is, in one embodiment, an electronic data structure such as a database that is stored in the memory 172 or another memory and that is configured with routines that can be executed by the processor(s) 110 for analyzing stored data, providing stored data, organizing stored data, and so on. Thus, in one embodiment, the data store 180 stores data used by the modules 174, 176, and 178 in executing various functions. In one embodiment, the data store 180 includes gesture data 182 along with, for example, other information that is used by the modules 174, 176, and 178. The gesture data 182 may include some or all information captured by elements of the gesture interpretation system, such as the Doppler radar devices 131A-131C and/or the camera(s) 132.

Accordingly, the receiving module 174 contains instructions that cause the processor(s) 110 to receive Doppler information from the Doppler radar devices 131A-131C. The information received from the Doppler radar devices 131A-131C may include the Doppler Effect and/or micro-Doppler Effect observed by the Doppler radar devices 131A-131C in the X-direction 192, the Y-direction 193, and the Z-direction 194, respectively.

Doppler information may be provided and/or utilized by the processor(s) 110 to generate and/or process a micro-Doppler cube when the extremity, such as the human hand 191, is located within the volume 190. The processor 110 may make this determination when the extremity 191 is located within the volume 190 by executing instructions located within the receiving module 174. Moreover, the processor(s) 110 may be configured by the receiving module 174 to determine based on Doppler information received from the Doppler radar devices 131A-131C if an extremity is located within the volume 190. However, it should be understood that the providing of the Doppler information and/or generating the micro-Doppler cube may not be premised on an extremity being located, either entirely or partially, within the volume 190.

Additionally or alternatively, the receiving module 174 may configure the processor(s) 110 to receive camera information from the camera(s) 132. The camera information from the camera(s) 132 may include one or more images captured by the camera(s) 132. The processor(s) 110, upon receiving the camera information from the camera(s) 132 may then be configured by the receiving module 174 to determine if an extremity is located within the volume 190 by observing the presence of any extremities located in the images from the camera information captured by the camera(s) 132. This determination of the presence of an extremity within the volume 190 can then be utilized by the processor(s) 110 to determine when an extremity is located within the volume 190 so as to analyze actions by the extremity within the volume 190 when extremity, at least partially, within the volume 190. Again, it should be understood that the providing of the Doppler information and/or generating the micro-Doppler cube may not be premised on an extremity being located, either entirely or partially, within the volume 190.

Figure 3:
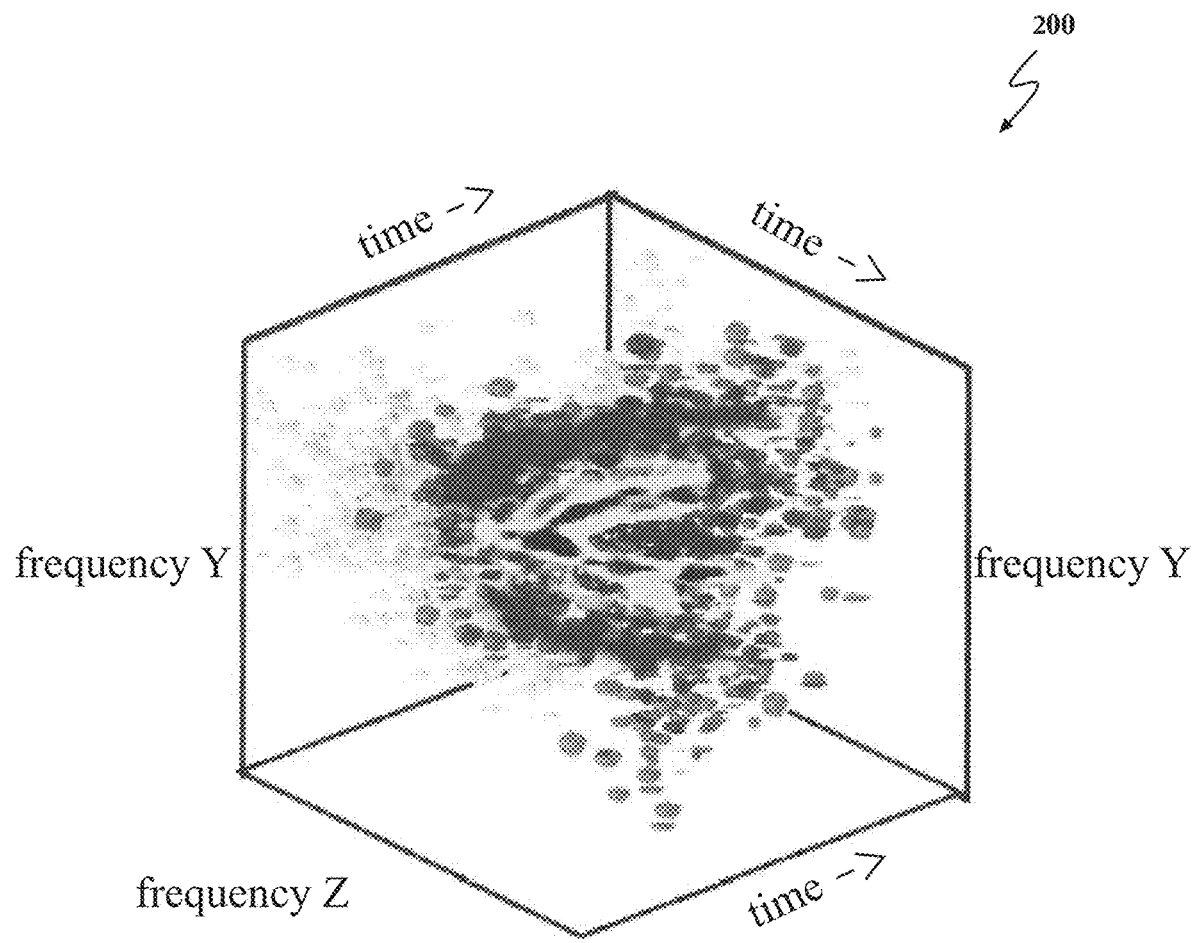
FIG. 3 illustrates an example of a micro-Doppler cube.

The cube generating module 176 may include instructions that, when executed by the processor(s) 110, cause the processor(s) 110 to generate a micro-Doppler cube based on the Doppler information received by the processor(s) 110 from the Doppler radar devices 131A-131C. The micro-Doppler cube may be, in one example, a data structure that illustrates Doppler information in a three-dimensional fashion. Moreover, FIG. 3 illustrates one example of a micro-Doppler cube 200. Here, the micro-Doppler cube 200 illustrates Doppler information captured by the Doppler radar devices 131A-131C in the X-direction 192, the Y-direction 193, and the Z-direction 194, respectively. Here, the micro-Doppler cube 200 is able to illustrate the time, frequency, and strength of the Doppler signals observed by the Doppler radar devices 131A-131C. The micro-Doppler cube 200 may be generated by projecting Doppler information from the Doppler radar devices 131A-131C onto three sides of the cube in the X, Y, and Z-directions.

Figure 4:
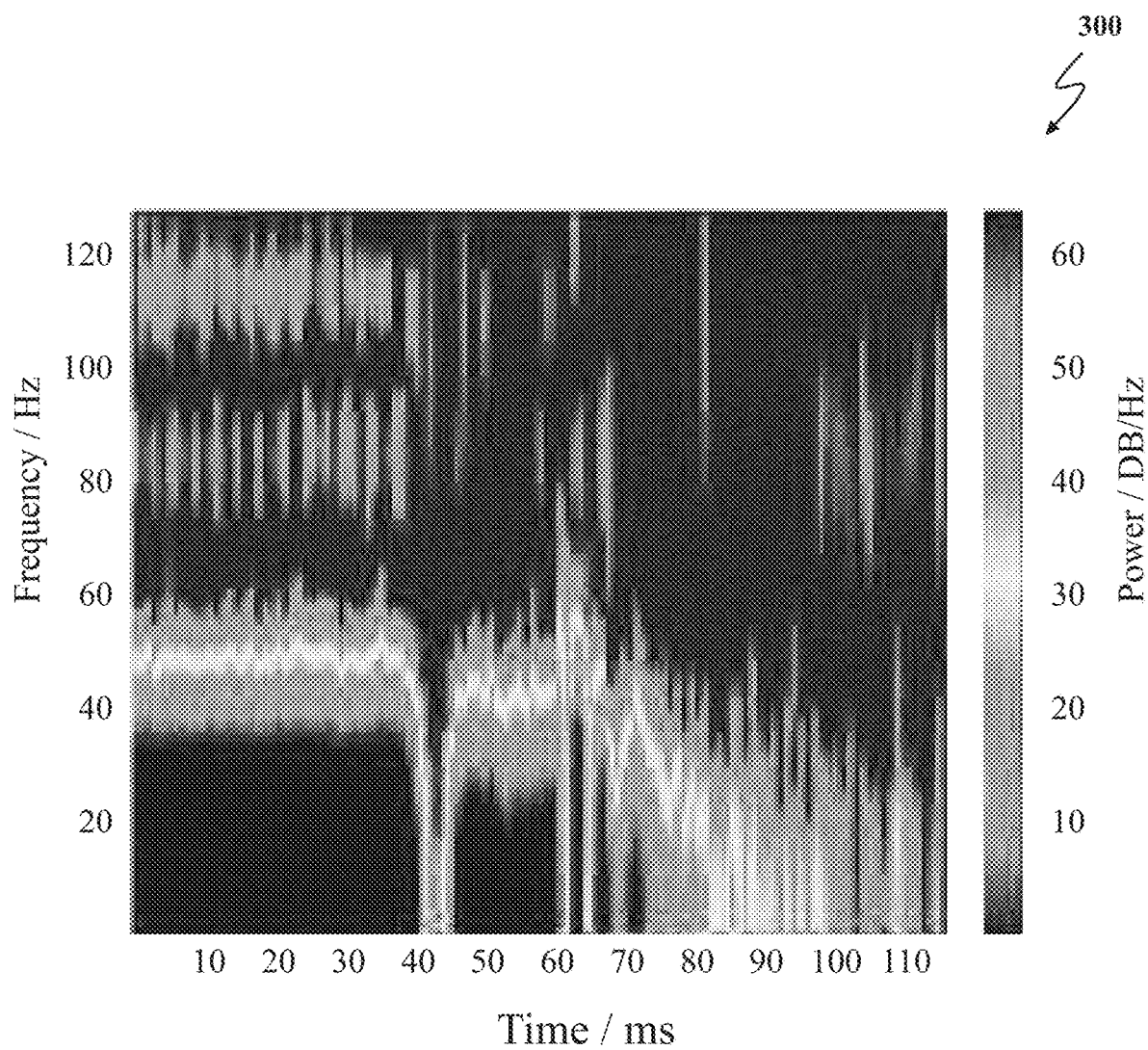
FIG. 4 illustrates an example of Doppler information.

As best illustrated in FIG. 4, Doppler information 300 captured by one of the Doppler radar devices 131A-131C is shown. In this example, the Doppler information 300 includes the frequency, time, and power of the signal received by one of the Doppler radar devices 131A-131C. The Doppler information 300 from each of the Doppler radar devices 131A-131C can then be projected into a cube to form the micro-Doppler cube 200 of FIG. 4. The construction of the cube can be accomplished because the Doppler radar devices 131A-131C may be located orthogonal to each other and therefore provide information in the X-direction 192, Y-direction 193, and Z-direction 194, respectively.

The time frame in which Doppler information is used to form the micro-Doppler cube 200 may be dictated by the presence of the human extremity 191 within the volume 190. As such, when the human extremity 191 or at least portions thereof, are located within the volume 190, the Doppler information captured from the Doppler radar devices 131A-131C during this time period may then be used to form the micro-Doppler cube 200.

The cube generating module 176 may also include instructions that, when executed by the processor(s) 110, segment image data from the camera(s) 132 when an extremity is located within the volume 190. Moreover, the cube generating module 176 causes the processor(s) 110 to segment image data from the camera data into fast-moving parts and slow-moving parts and associate portions of the Doppler information with fast-moving parts and slow-moving parts of the camera data.

By associating Doppler information with fast-moving parts and slow-moving parts, a determination can be made regarding the overall speed of the movement of the gestures performed within the volume 190. This can allow the processor(s) 110 to perform geometrical analysis through blurred/non-blurred parts of the camera data by observing the fast-moving and slow-moving parts of the Doppler information. Geometric analysis may include the use of nonlinear partial differential equations to study geometric and topological properties of spaces, such as submanifolds of Euclidean space, Riemannian manifolds, and symplectic manifolds.

The classification module 178 contains instructions that, when executed by the one or more processor(s) 110, causes the one or more processor(s) 110 to classify the movement of the extremity 191 within the volume 190 based on the micro-Doppler cube 200. In one example, the classification module 178 may utilize machine-learning algorithms that have been trained using annotated micro-Doppler cubes representing known gestures. By observing the micro-Doppler cube 200, the classification module 178 can cause the one or more processor(s) 110 to classify the gesture into a category. The category may be a single category or may be multiple categories containing multiple gestures. In addition to utilizing the micro-Doppler cube to classify a gesture, the classification module 178 may also configure the processor(s) 110 to utilize camera data that was previously used to associate Doppler information with fast-moving parts and slow-moving parts.

For example, the micro-Doppler cube 200 may be representative of a "thumbs up" gesture by a human hand. The classification module 178 configures the processor(s) 110 to determine that the gesture represented the micro-Doppler cube 200 is a "thumbs up" gesture. In one example, once the processor(s) 110 has determined that the gesture is a "thumbs up" gesture, the system 170 may instruct another vehicle system, such as an infotainment system 148 of the vehicle to adjust the volume of one or more speakers up. Conversely, if the micro-Doppler cube 200 represents a "thumbs down" gesture, the gesture interpretation system

170 may instruct the infotainment system 148 to turn the volume of one or more speakers down.

It should be understood that the number of gestures and what the gestures control can vary significantly from one application to another. Some gestures may be able to control the infotainment system 148, while other gestures may be able to control other vehicle systems 140, such as the propulsion system 141, the braking system 142, the steering system 143, the throttle system 144, the transmission system 145, the signaling system 146, and/or the navigation system 147. Again, it should be understood that this is not an exhaustive list, but just one example of the types of systems that can be controlled by using gestures.

Furthermore, the types of gestures utilize can vary significantly as well. For example, the gestures recognized by the gesture interpretation system 170 may be gestures from a human hand, but it should be equally understood that the gestures may be from other human extremities such as the head, arms, feet, legs, or any part of the human body. Furthermore, the gestures may extend beyond the human body may also include gestures performed by animals or robots. Further materials, such as clothing, such as gloves, mittens, etc., may cover the extremity 191. If gestures from a human hand are being considered, these gestures could include a thumbs up, thumbs down, waves, an extension of different fingers or combinations thereof and the like. Again, it should be understood that this is not an exhaustive list but just an example of different gestures that can be considered by the gesture interpretation system 170.

Referring to FIG. 5, a method 400 for interpreting gestures is shown. The method 400 will be described from the viewpoint of the vehicle 100 of FIG. 1 and the gesture interpretation system 170 of FIG. 2. However, it should be understood that this is just one example of implementing the method 400. While method 400 is discussed in combination with the gesture interpretation system 170, it should be appreciated that the method 400 is not limited to being implemented within the gesture interpretation system 170, but is instead one example of a system that may implement the method 400.

Moreover, the method 400 of FIG. 5 begins at step 402, wherein the receiving module 174 causes the one or more processor(s) 110 to receive camera data from the camera(s) 132. The camera data may be in the form of one or more captured images captured by the camera(s) 132. Here, the camera(s) 132 may be mounted such that the camera(s) 132 have a field-of-view 195 that includes the volume 190.

In step 404, the receiving module 174 causes the one or more processor(s) 110 to determine if a human extremity is located within the fields of view of the Doppler radar devices. Moreover, the fields of view of the Doppler radar devices may include the volume 190. In order to make this determination, the receiving module 174 may cause the processor(s) 110 to evaluate the camera data from the camera(s) 132. If the images of the camera data from the camera(s) 132 indicate that the extremity 191 is located within the volume 190, the method proceeds to step 406. Otherwise, the method 400 may proceed to step 402. How Additionally or alternatively, a determination of whether an extremity is located within the fields of view of the Doppler radar devices 131A-131C may be performed by evaluating Doppler information from the Doppler radar devices 131A-131C. Based on the Doppler information, which includes the Doppler Effect sensed by the Doppler radar devices 131A-131C, the processor(s) 110 can determine if the extremity 191 is located within the volume 190. However, it should be understood that the providing of the Doppler information and/or generating the micro-Doppler cube may not be premised on an extremity being located, either entirely or partially, within the volume 190, as such, step 404 may be optional.

Either way, once it is determined that an extremity is located within the volume 190, the method proceeds to step 406. In step 406, the receiving module 174 causes the one or more processor(s) 110 to receive Doppler information from at least three Doppler radar devices, such as the Doppler radar devices 131A-131C.

In step 408, the cube generating module 176 causes the processor is 110 to generate a micro-Doppler cube by projecting Doppler information in the X, Y, and Z-directions which corresponds to the Doppler radar devices 131A-131C, respectively. In other words, the Doppler radar device 131A may have a field-of-view in the X-direction 192, the Doppler radar device 131B may have a field-of-view in the Y-direction 193, and finally, the Doppler radar device 131C may have a field-of-view in the Z-direction 194. As such, the cube generating module 176 causes the processor(s) 110 to generate a micro-Doppler cube, which essentially projects the Doppler information captured by the Doppler radar devices 131A-131C in the X, Y, and Z-directions, respectively.

The generating of the micro-Doppler cube in step 408 may be realized by considering Doppler information that occurred while the human extremity was at least partially located within the fields of view, and thus the volume 190. As such, the Doppler information that is utilized to generate the micro-Doppler cube can begin with when the extremity is placed within the volume 190 and then can end when the extremity is removed from the volume 190. By so doing, the amount of information processed is limited to Doppler information gathered when the extremity was within the volume 190. Further, the information that is utilized to generate the micro-Doppler cube can begin when a gesture is being performed by an extremity at least partially within the volume 190, and not just when the extremity is partially within the volume 190, as detected by the Doppler radar devices 131A-131C and/or camera(s) 132

In step 410, the classifying module 178 causes the processor(s) 110 to classify a movement of the human extremity 191 located within the volume 190 into a category based on the micro-Doppler cube. Here, the classifying module 178 may configure the processor(s) 110 to utilize a machine learning trained algorithm that has been trained to classify the movement of the extremity 191 within the volume 190 analyzing the Doppler cube generated by the processor(s) 110 in the previous step. In addition to utilizing the micro-Doppler cube to classify a gesture, the classification module 178 may also configure the processor(s) 110 to utilize camera data that was previously used to associate Doppler information with fast-moving parts and slow-moving parts.

In step 412, once the processor(s) 110 classifies the movement of the human extremity, the processor(s) 110 may actuate at least one system, such as the vehicle systems 140 of FIG. 1, based on the category the movement of the human extremity previously determined in step 410. From there, the method then returns to step 402 and begin again.

FIG. 1 will now be discussed in full detail as an example environment within which the system and methods disclosed herein may operate. In one or more embodiments, the vehicle 100 is an autonomous vehicle, but the vehicle 100 could also be a semi-autonomous or non-autonomous vehicle. As used herein, "autonomous vehicle" refers to a vehicle that operates in an autonomous mode. "Autonomous mode" refers to navigating and/or maneuvering the vehicle 100 along a travel route using one or more computing systems to control the vehicle 100 with minimal or no input from a human driver. In one or more embodiments, the vehicle 100 is highly automated or completely automated. In one embodiment, the vehicle 100 is configured with one or more semi-autonomous operational modes in which one or more computing systems perform a portion of the navigation and/or maneuvering of the vehicle 100 along a travel route, and a vehicle operator (i.e., driver) provides inputs to the vehicle to perform a portion of the navigation and/or maneuvering of the vehicle 100 along a travel route.

The vehicle 100 can include one or more processor(s) 110. In one or more arrangements, the processor(s) 110 can be a main processor of the vehicle 100. For instance, the processor(s) 110 can be an electronic control unit (ECU). The term "operatively connected" or "in communication with" as used throughout this description, can include direct or indirect connections, including connections without direct physical contact.

As noted above, the vehicle 100 can include the sensor system 120. The sensor system 120 can include one or more sensors. "Sensor" means any device, component and/or system that can detect and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can work independently from each other. Alternatively, two or more of the sensors can work in combination with each other. In such a case, the two or more sensors can form a sensor network. The sensor system 120 and/or the one or more sensors can be operatively connected to the processor(s) 110, the data store(s) 115, and/or another element of the vehicle 100 (including any of the elements shown in FIG. 1). The sensor system 120 can acquire data of at least a portion of the external environment of the vehicle 100 (e.g., nearby vehicles).

The sensor system 120 can include any suitable type of sensor. Various examples of different types of sensors will be described herein. However, it will be understood that the embodiments are not limited to the particular sensors described. The sensor system 120 can include one or more vehicle sensor(s) 121. The vehicle sensor(s) 121 can detect, determine, and/or sense information about the vehicle 100 itself. In one or more arrangements, the vehicle sensor(s) 121 can be configured to detect, and/or sense position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect, and/or sense one or more characteristics of the vehicle 100. In one or more arrangements, the vehicle sensor(s) 121 can include a speedometer to determine a current speed of the vehicle 100.

Alternatively, or in addition, the sensor system 120 can include one or more environment sensors 122 configured to acquire, and/or sense driving environment data. "Driving environment data" includes data or information about the external environment in which an autonomous vehicle is located or one or more portions thereof. For example, the one or more environment sensors 122 can be configured to detect, quantify and/or sense obstacles in at least a portion of the external environment of the vehicle 100 and/or information/data about such obstacles. Such obstacles may be stationary objects and/or dynamic objects. The one or more environment sensors 122 can be configured to detect, measure, quantify and/or sense other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensor(s) 121. However, it will be understood that the embodiments are not limited to the particular sensors described.

As an example, in one or more arrangements, the sensor system 120 can include one or more radar sensors 123, one or more LIDAR sensors 124, one or more sonar sensors 125, and/or one or more cameras 126. In one or more arrangements, the one or more cameras 126 can be high dynamic range (HDR) cameras or infrared (IR) cameras.

The vehicle 100 can include an input system 136. An "input system" includes any device, component, system, element, or arrangement or groups thereof that enable information/data to be entered into a machine. The input system 136 can receive an input from a vehicle passenger (e.g., a driver or a passenger). The vehicle 100 can include an output system 135. An "output system" includes any device, component, or arrangement or groups thereof that enable information/data to be presented to a vehicle passenger (e.g., a person, a vehicle passenger, etc.).

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 141, a braking system 142, a steering system 143, throttle system 144, a transmission system 145, a signaling system 146, a navigation system 147 and/or an infotainment system 148. Each of these systems can include one or more devices, components, and/or a combination thereof, now known or later developed.

The navigation system 147 can include one or more devices, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system, or a geolocation system.

The processor(s) 110 and/or the gesture interpretation system 170 can be operatively connected to communicate with the various vehicle systems 140 and/or individual components thereof. For example, returning to FIG. 1, the processor(s) 110 and/or the gesture interpretation system 170 can be in communication to send and/or receive information from the various vehicle systems 140 to control the movement, speed, maneuvering, heading, direction, etc. of the vehicle 100. The processor(s) 110 and/or the gesture interpretation system 170 may control some or all of these vehicle systems 140 and, thus, may be partially or fully autonomous.

The processor(s) 110 and/or the gesture interpretation system 170 can be operatively connected to communicate with the various vehicle systems 140 and/or individual components thereof. For example, returning to FIG. 1, the processor(s) 110 and/or the gesture interpretation system 170 can be in communication to send and/or receive information from the various vehicle systems 140 to control the movement, speed, maneuvering, heading, direction, etc. of the vehicle 100. The processor(s) and/or the gesture interpretation system 170 may control some or all of these vehicle systems 140.

The processor(s) 110 and/or the gesture interpretation system 170 may be operable to control the navigation and/or maneuvering of the vehicle 100 by controlling one or more of the vehicle systems 140 and/or components thereof.

The vehicle 100 can include one or more actuators 150. The actuators 150 can be any element or combination of elements operable to modify, adjust and/or alter one or more of the vehicle systems 140 or components thereof to responsive to receiving signals or other inputs from the processor(s) 110. Any suitable actuator can be used. For instance, the one or more actuators 150 can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor(s) 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110. Alternatively, or in addition, one or more data store(s) 115 may contain such instructions.

In one or more arrangements, one or more of the modules described herein can include artificial or computational intelligence elements, e.g., neural network, fuzzy logic, or other machine learning algorithms. Further, in one or more arrangements, one or more of the modules can be distributed among a plurality of the modules described herein. In one or more arrangements, two or more of the modules described herein can be combined into a single module.

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-5, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain or store a program for use by or in connection with an instruction execution system, apparatus, or device.

Generally, module, as used herein, includes routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC, or ABC).

Aspects herein can be embodied in other forms without departing from the spirit or essential attributes thereof. Accordingly, reference should be made to the following claims rather than to the foregoing specification, as indicating the scope hereof.

What is claimed is:

1. A system for interpreting gestures comprising:
one or more processors;
at least three Doppler radar devices in communication with the one or more processors each of the at least three Doppler radar devices having a field of view that includes a volume;
at least one camera in communication with the one or more processors;
a memory device in communication with the one or more processors, the memory device having instructions;
wherein the instructions, when executed by the one or more processors, cause the one or more processors to receive Doppler information from the at least three Doppler radar devices and camera data from the at least one camera, the camera data including at least one image from the at least one camera;
wherein the instructions, when executed by the one or more processors cause the one or more processors to generate a micro-Doppler cube by projecting Doppler information in X, Y, and Z-directions over a period of time into the micro-Doppler cube; and
wherein instructions, when executed by the one or more processors cause the one or more processors to determine when an area of the at least one image includes a portion of an extremity and classify one or more gestures performed by the extremity when located in the volume into a category of a plurality of categories based on the micro-Doppler cube.

2. The system of claim 1, wherein the period of time includes a time that the portion of the extremity is located within the area of the at least one image.

3. The system of claim 1, further comprising instructions that, when executed by the one or more processors, causes the one or more processors to segment image data from the camera data into fast-moving parts and slow-moving parts and associate portions of the Doppler information with fast-moving parts and slow-moving parts of the camera data.

4. The system of claim 3, further comprising instructions that, when executed by the one or more processors, causes the one or more processors to perform geometrical analysis through blurred/non-blurred parts of the camera data.

5. The system of claim 1, further comprising instructions that, when executed by the one or more processors, causes the one or more processors to actuate at least one system based on the category of the one or more gestures performed by the extremity.

6. The system of claim 1, wherein the at least three Doppler radar devices are located within a cabin of a vehicle.

7. The system of claim 1, further comprising instructions that, when executed by the one or more processors, causes the one or more processors to project Doppler information from a first Doppler radar device of the at least three Doppler radar devices in the X-direction of the micro-Doppler cube, project Doppler information from a second Doppler radar device of the at least three Doppler radar devices in the Y-direction of the micro-Doppler cube, and project Doppler information from a third Doppler radar device of the at least three Doppler radar devices in the Y-direction of the micro-Doppler cube.

8. The system of claim 1, further comprising instructions that, when executed by the one or more processors, causes the one or more processors to classify the one or more gestures performed by the extremity into the category of the plurality of categories based on the micro-Doppler cube by utilizing a trained machine-learning algorithm.

9. A method for interpreting gestures, the method comprising the steps of:
receiving Doppler information from at least three Doppler radar devices, each of the at least three Doppler radar devices having a field of view that includes a volume;
receiving camera data including at least one image from at least one camera;
determining when an area of the at least one image from the at least one camera includes a portion of an extremity;
generating a micro-Doppler cube by projecting Doppler information in X, Y, and Z-directions over a period of time into the micro-Doppler cube; and
classifying one or more gestures performed by the extremity when located in the volume into a category of a plurality of categories based on the micro-Doppler cube.

10. The method of claim 9, wherein the period of time includes a time that the portion of the extremity is located within the area of the at least one image.

11. The method of claim 9, further comprising the steps of:
segmenting image data from the at least one camera into fast-moving parts and slow-moving parts; and
associating portions of the Doppler information with fast-moving parts and slow-moving parts of the camera data.

12. The method of claim 11, further comprising the step of performing geometrical analysis through blurred/non-blurred parts of the image data.

13. The method of claim 12, wherein the step of associating portions of the Doppler information with fast-moving parts and slow-moving parts of the image data is performed by machine learning.

14. The method of claim 9, further comprising the step of actuating at least one system based on the category of the one or more gestures performed by the extremity.

15. The method of claim 9, further comprising the steps of:
projecting Doppler information from a first Doppler radar device of the at least three Doppler radar devices in the X-direction of the micro-Doppler cube;
projecting Doppler from a second Doppler radar device of the at least three Doppler radar devices in the Y-direction of the micro-Doppler cube; and
projecting Doppler from a third Doppler radar device of the at least three Doppler radar devices in the Z-direction of the micro-Doppler cube.

16. A non-transitory computer-readable medium for interpreting gestures, the non-transitory computer-readable medium comprising instructions that when executed by one or more processors cause the one or more processors to:
receive Doppler information from at least three Doppler radar devices, each of the at least three Doppler radar devices having a field of view that includes a volume;
receive camera data including at least one image from at least one camera;
determine when an area of the at least one image from the at least one camera includes a portion of an extremity;
generate a micro-Doppler cube by projecting Doppler information in X, Y, and Z-directions over a period of time into the micro-Doppler cube; and
classify one or more gestures performed by the extremity when located in the volume into a category of a plurality of categories based on the micro-Doppler cube.

17. The non-transitory computer-readable medium of claim 16, wherein the period of time includes a time that the portion of the extremity is located within the area of the at least one image.

* * * * *